Patented Dec. 3, 1935

2,022,923

UNITED STATES PATENT OFFICE 2,022,923

DIAZONIUM COMPOUNDS

Anton Ossenbeck, Cologne-Mulheim, and Ernst Tietze, Cologne-on-the-Rhine, Germany, assignors to General Aniline Works, Inc., New York, N. Y., a corporation of Delaware No Drawing. Application February 9, 1933, Serial No. 656,026. In Germany February 13, 1932

4 Claims. (Cl. 260—69)

The present invention relates to new diazonium compounds, more particularly it relates to compounds which may be represented by the general formula:

R.N=N—SO₃—R'—NH—X wherein R stands for the radical of a diazotized non-sulfonated diazotization component suitable for producing azodyestuffs, R' stands for an aromatic radical, for example, for a benzene-, naphthalene-, carbazole-, anthracene- and acenaphthene nucleus and X stands for the radical of a carboxylic acid which is attached with the carbon atom of the CO-group to the N-atom of the NH-group, and wherein R and R' may be substituted, for example, by alkyl, alkoxy, halogen, the substituted amino group, such as acylamino and alkylamino or phenylamino, further carboxyl and in the case of R' also by the sulfonic acid group.

Our new diazonium compounds are obtainable by diazotizing a highly concentrated aqueous solution of a non-sulfonated diazotization component suitable for producing an azodyestuff in the usual manner, for example, with hydrochloric acid and sodium nitrite, and adding thereto a highly concentrated aqueous solution of an aromatic sulfonic acid substituted at least once by the radical of an acylamino group derived from a carboxylic acid, or of a water-soluble salt, especially an alkali metal salt, thereof, care being taken that the process is performed at low temperatures, say between 0 and 10° C., and that the concentration of the solutions poured together is as high as possible, in order to facilitate the separation of the new diazonium salts formed.

In some cases when the solubility of the new diazonium compound formed is extremely high, a method of their manufacture resides in preparing a highly concentrated solution of the diazonium compound and adding thereto a water-soluble salt of the acylamino-arylsulfonic acid in a finely divided form or the free acid.

The new compounds generally crystallize from their solutions from which they are separated by filtering with suction. They are dried at moderate temperature, say between temperatures of 20-50° C., if desired, with the application of a vacuo, and are obtained in form of stable, yellow to orange, more or less water soluble crystalline substances. They are valuable intermediate products in the manufacture of azodyestuffs, inasmuch as they are soluble in water, yielding diazo solutions which can be coupled in the usual manner with coupling components forming azodyestuffs.

The invention is illustrated by the following examples, without being limited thereto:

Example 1.—142,5 parts by weight of 4-chloro-2-amino-1-methylbenzene are diazotized in a concentrated aqueous solution with hydrochloric acid and 69 parts by weight of sodium nitrite. In this solution there is dissolved at a temperature below 20° C. somewhat more than the calculated quantity of 1-acetylaminobenzene-4-sodium sulfonate. After a short time yellow crystals separate, and by cooling down to zero the separation can be completed. The crystal magma is centrifuged and the crystals thus obtained are dried at a temperature below 50° C. The dry diazonium salt of the 1-acetylaminobenzene-4-sulfonic acid which probably corresponds to the following formula:

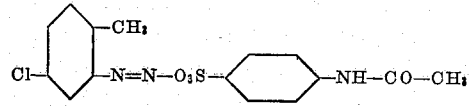

is easily soluble in water, stable per se or in mixture with the usual diluents, non-explosive and not sensitive to rubbing.

By substituting the 1-acetylaminobenzene-4-sodium sulfonate by the equivalent quantity of 1-acetylaminonaphthalene-4-sodium sulfonate or by 1-acetylaminonaphthalene-5-sodium sulfonate, there are obtained in the same manner the corresponding diazonium salts having similar properties.

Example 2.—152 parts by weight of 5-nitro-2-amino-1-methylbenzene are diazotized in a concentrated aqueous solution with hydrochloric acid and 69 parts by weight of sodium nitrite. Into the solution thus obtained there is introduced a concentrated solution of somewhat more than the calculated quantity of 2-acetylaminobenzene-4-sulfonic acid-1-carboxylic acid, whereupon the diazonium salt of the probable formula

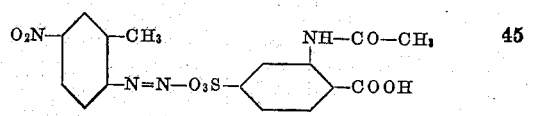

separates in beautiful crystals. The reaction mixture is worked up as described in Example 1.

Example 3.—608 parts by weight of 4-nitro-2-amino-1-methylbenzene are stirred into a mixture of 1000 parts by weight of hydrochloric acid of 30% strength and 600 parts by weight of ice and diazotized with a solution of 280 parts by weight of sodium nitrite and 400 parts by weight of water. The diazo solution is filtered, thereto is added a solution of 950 parts by weight of 1-acetylaminobenzene-4-sodium sulfonate in 700 parts by weight of water. The mixture solidifies to an intense yellow crystal magma; the same is cooled to −10° C., while stirring, and filtered with suction. Drying is performed at 20–25° C. The diazonium salt of the probable formula

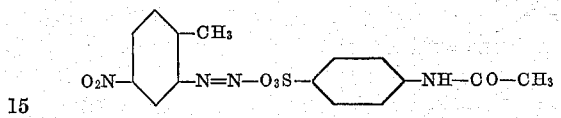

is a yellow crystalline powder, easily soluble in water.

In the following table there are given the colorations and solubilities of the diazonium salts of some further acylaminoarylsulfonic acids with some diazotized bases.

| | Acidylaminoaryl-sulfonic acid | Diazotized base | Coloration of the diazonium salt | Solubility of the diazonium salt |
|---|---|---|---|---|
| 1. | 1-acetylaminobenzene-4-sulfonic acid | 5-nitro-2-amino-1-methylbenzene | Golden yellow | Well soluble. |
| | Do | 3-chloro-1-aminobenzene | Pale yellow | Very well soluble. |
| | Do | 3-nitro-4-amino-1-methylbenzene | Orange | Very well soluble. |
| | Do | 2-amino-5-benzoylamino-hydroquinone-diethylether | Greenish yellow | Difficultly soluble. |
| | Do | 2,5-dichloro-aniline | Yellow | Well soluble. |
| | Do | 6-chloro-2-amino-1-methylbenzene | Yellow | Well soluble. |
| 2. | 1-acetylaminobenzene-3-sulfonic acid | 3-chloro-1-aminobenzene | White | Very well soluble. |
| 3. | 1-acetylaminonaphthalene-4-sulfonic acid | 4-chloro-2-amino-1-methylbenzene | Yellow | Very well soluble. |
| | Do | 4-nitro-2-amino-1-methylbenzene | Yellowish-orange | Well soluble. |
| | Do | 5-nitro-2-amino-1-methylbenzene | Yellowish-orange | Well soluble. |
| 4. | 1-acetylaminonaphthalene-5-sulfonic acid | 5-nitro-2-amino-1-methylbenzene | Orange | Rather soluble. |
| | Do | 3-chloro-1-aminobenzene | Yellowish | Very well soluble. |
| 5. | 1-acetylaminobenzene-2,4-disulfonic acid | 5-nitro-2-amino-1-methylbenzene | Yellow | Very well soluble. |
| 6. | 2-acetylamino-1-methylbenzene-4,5-disulfonic acid | 4-nitro-2-amino-1-methylbenzene | Yellow | Well soluble. |
| 7. | 2-acetylaminonaphthalene-5,7-disulfonic acid | 4-chloro-2-amino-1-methylbenzene | Yellow | Very well soluble. |
| 8. | 2-acetylamino-1-benzoicacid-4-sulfonic acid | 5-nitro-2-amino-1-methylbenzene | Golden yellow | Well soluble. |
| 9. | 1-acetylaminonaphthalene-4,6,8-trisulfonic acid | m-toluidine-azo-meta toluidine | Brown | Rather soluble. |
| 10. | 1,3-bis-acetylaminobenzene-4-sulfonic acid | 4-chloro-2-amino-1-methylbenzene | Yellow | Well soluble. |
| 11. | 1-acetylamino-2-chlorobenzene-4-sulfonic acid | 4-chloro-2-amino-1-methylbenzene | Yellow | Very well soluble. |
| 12. | 1-chloroacetylaminobenzene-4-sulfonic acid | 3-chloro-1-aminobenzene | Yellow | Very well soluble. |
| 13. | 1-propionyl-aminobenzene-4-sulfonic acid | 4-chloro-2-amino-1-methylbenzene | Yellow | Very well soluble. |
| 14. | 1-benzoylamino-benzene-4-sulfonic acid | 4-chloro-2-amino-1-methylbenzene | Pale yellow | Difficultly soluble. |
| 15. | Ethylester-oxalylamino-benzene-4-sulfonic acid | 3-chloro-1-aminobenzene | White | Very well soluble. |
| 16. | 4-sulfophenyl-oxaminic acid | 4-nitro-2-amino-1-methylbenzene | Yellow | Very well soluble. |
| 17. | 4-sulfophenylurea | 4-chloro-2-amino-1-methylbenzene | Yellow | Well soluble. |
| 18. | 4-solfophenylthiourea | 4-chloro-2-amino-1-methylbenzene | Yellowish-orange | Well soluble. |
| 19. | Urea of 1-aminobenzene-4-sulfonic acid | 4-chloro-2-amino-1-methylbenzene | Pale yellow | Rather difficultly soluble. |
| 20. | 4,4'-disulfodiphenyloxamide-(sodium sulfonate) | 3-chloro-1-aminobenzene | Yellow | Well soluble. |

We claim:

1. The diazonium salts of the general formula:

R—N=N—SO₃—R'—NH—X wherein R stands for the radical of a diazotized non-sulfonated diazotization component suitable for producing azodyestuffs, R' stands for an aromatic radical and X stands for the radical of a carboxylic acid which is attached with the carbon atom of the CO-group to the N-atom of the NH-group, being generally stable, yellow to orange, crystalline substances soluble in water, and being valuable intermediate products in the manufacture of dyestuffs.

2. The diazonium salts of the general formula:

R—N=N—SO₃—R'—NH—X wherein R stands for the radical of a diazotized non-sulfonated diazotization component of the benzene or naphthalene series, R' stands for a radical of the benzene or naphthalene series and X stands for the radical of a carboxylic acid which is attached with the carbon atom of the CO-group to the N-atom of the NH-group, being generally stable, yellow to orange, crystalline substances, soluble in water, and being valuable intermediate products in the manufacture of dyestuffs.

3. The diazonium salt of the formula:

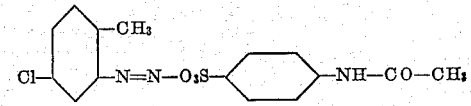

being a stable, yellow, crystalline substance, soluble in water, and being a valuable intermediate product in the manufacture of dyestuffs.

4. The diazonium salt of the formula:

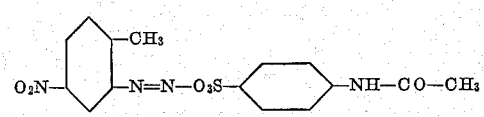

being a stable, yellow, crystalline substance, soluble in water, and being a valuable intermediate product in the manufacture of dyestuffs.

ANTON OSSENBECK.
ERNST TIETZE.